(12) United States Patent
Blalock et al.

(10) Patent No.: US 6,688,359 B2
(45) Date of Patent: Feb. 10, 2004

(54) PNEUMATIC INNER LINER FOR A TIRE

(75) Inventors: Gary Lunsford Blalock, Easley, SC (US); Matthew J. Forthofer, Greenville, SC (US)

(73) Assignee: Michelin Recherche et Technique, S.A., Granges-Paccot (CH)

( * ) Notice: Subject to any disclaimer, the term of this patent is extended or adjusted under 35 U.S.C. 154(b) by 105 days.

(21) Appl. No.: 09/943,926

(22) Filed: Aug. 31, 2001

(65) Prior Publication Data

US 2003/0041941 A1 Mar. 6, 2003

(51) Int. Cl.$^7$ .............................. B60C 5/22; B60C 13/02
(52) U.S. Cl. ...................................... 152/523; 152/340.1
(58) Field of Search ................................. 152/523, 518, 152/340.1, 339.1, 341.1, 342.1, 331.1, 544, 500, 513, 379.5, DIG. 9; D12/605

(56) References Cited

U.S. PATENT DOCUMENTS

| | | | | |
|---|---|---|---|---|
| 1,915,963 A | * | 6/1933 | Wait | ............. 152/544 |
| 2,169,041 A | | 8/1939 | Gammeter | |
| 2,608,235 A | | 8/1952 | Wyman | |
| 2,675,846 A | | 4/1954 | Wyman | |
| 2,731,061 A | | 1/1956 | Clark | |
| 2,779,380 A | | 1/1957 | King et al. | |
| 3,191,654 A | | 6/1965 | Anderson et al. | |
| 3,225,811 A | | 12/1965 | Hawkes | |
| D204,861 S | * | 5/1966 | Blankenship et al. | ....... D12/605 |
| 3,421,535 A | | 1/1969 | Hawkes et al. | |
| 3,476,168 A | | 11/1969 | Huber et al. | |
| 3,487,870 A | | 1/1970 | Huber | |
| 3,496,983 A | | 2/1970 | Bartley et al. | |
| 3,724,521 A | | 4/1973 | Coddington et al. | |
| 3,861,438 A | * | 1/1975 | Bertelli et al. | ............. 152/523 |
| 4,153,095 A | | 5/1979 | Sarkissian | |
| 4,246,948 A | | 1/1981 | Sarkissian | |
| 4,262,724 A | | 4/1981 | Sarkissian | |
| 4,318,434 A | | 3/1982 | Markow | |
| D293,563 S | * | 1/1988 | Fuzioka et al. | ............ D12/605 |
| 4,995,438 A | | 2/1991 | Weber et al. | |
| 5,035,273 A | | 7/1991 | Ruvio | |
| 5,246,050 A | | 9/1993 | Stucker et al. | |
| 5,273,093 A | | 12/1993 | Newton | |

FOREIGN PATENT DOCUMENTS

| | | |
|---|---|---|
| JP | 0037301 | 3/1977 |
| SE | 0159598 | 7/1957 |

OTHER PUBLICATIONS

Burton, Walter E. *The Story of Tire Beads and Tires*, McGraw Hill Book Company, 1954, pp 138–141, New York, New York.

* cited by examiner

*Primary Examiner*—Geoffrey L. Knable
(74) *Attorney, Agent, or Firm*—E. Martin Remick; Alan A. Csontos; Martin Farrell

(57) ABSTRACT

An inner tire used in a dual-chambered tire is provided by an inner tire in which an exterior sidewall of tire provides for two annular rows of overlapping raised facets that extend above the exterior surface of the tire. Each facet defines a right angle with respect to the adjacent sidewall of the tire and provides for an elevated surface having a substantially uniform height with respect to the underlying tire exterior surface. The facets further define a plurality of gaps and passageways that have a constant height and through which pressurized air may flow during the inflation of the outer tire. The air gaps and air passageways defined by the facets have a sufficient depth that the resulting passageways do not collapse when the pressurized inner tire is in engagement with the pressurized outer tire.

11 Claims, 5 Drawing Sheets

PNEUMATIC INNER LINER FOR A TIRE

FIELD OF THE INVENTION

This invention is directed towards a multi-chambered tire. More particularly, this invention relates to a pneumatic tire that is positioned within an interior of an outer pneumatic tire.

BACKGROUND OF THE INVENTION

A tire assembly often employs an inner pneumatic structure, such as a tire, which is mounted on a rim and is positioned axially inward of the bead portion of an outer pneumatic tire.

When assembled, the inner tire of a tire assembly is positioned within the outer tire and helps stabilize a vehicle should the outer tire lose pressure. The wheel arrangement provides for a tire assembly having outer and inner air chambers, the outer chamber being defined by the space between the radially outer surface of the inner tire and the radially inner surface of the outer tire. Similarly, the inner chamber is formed by the inner surface of the inner tire and the associated wheel rim.

It is desirable to maintain a pressure within the inner air chamber that is greater than the pressure within the outer air chamber. The pressure differential between the inner tire and the outer tire facilitates the seating of the outer tire bead to the wheel rim. In addition, the inner engagement between the inner tire exterior surface and the interior surface of the outer tire results in an airtight seal. Accordingly, it is necessary to maintain an air inflation pathway between the interior surface of the exterior tire and the exterior surface of the inner tire. While the prior art provides for various tire assemblies having an inner tire and outer tire combination, there remains room for variation and improvement within the art.

SUMMARY OF THE INVENTION

It is one aspect of the present invention to provide a pneumatic tire that may be used as an inner tire insert within the interior of a second tire.

It is another aspect of the present invention to provide for an interior pneumatic tire that defines a non-collapsible air passageway through which the associated outer tire may be reliably inflated when the inner tire and outer tire are mounted on a wheel.

In another aspect, the invention resides in an inner tire for use within an interior of an outer tire, the inner tire providing a plurality of raised projections, each projection providing a substantially flat, uniform surface for engagement of the inner surface of the exterior tire.

It is yet another aspect of the present invention to provide an inner tire having at least two distinct annular rows of raised facets that extend above the underlying exterior surface of the tire. A channel formed between each pair of facets within each respective row further defines a radially extending air passageway. The innermost row of facets are positioned within an overlapping, staggered arrangement with respect to the outermost row of facets. An annular space defined between the first row of facets and the second row of facets provides a circumferential air passageway that extends along the exterior surface of the inner tire. A similar circumferential passageway is defined between the proximal edge of the first row of facets and the bead heel surface.

In yet another aspect, the invention resides in a pneumatic inner liner for a tire comprising: a pneumatic structure having an interior surface, an exterior surface, and a sidewall portion extending radially inward from each axial edge of a cover portion to a respective bead portion, the sidewall having an exterior surface further defining a plurality of facets defining a first annular row, each of the facets extending above an outer surface of the liner a uniform height and each facet having a plurality of edge walls which form a substantially right angle with respect to the sidewall surface; a plurality of first gaps defined between each of the plurality of facets; a plurality of second facets defining a second annular row, each of the second plurality of facets positioned on an exterior of the sidewall between a bead of said liner and said first annular row of facets, each of the second plurality of facets extending above an outer surface of the liner and further defining a plurality of edge walls, each of said edge walls forming a generally right angle with respect to the exterior surface of the liner; a plurality of second gaps defined between each of the facets of the second annular rows, a first circumferential passageway defined between the first annular row and the second annular row, the first circumferential passageway in fluid communication with the plurality of first gaps and the plurality of second gaps; and, a second circumferential passage defined between a proximal edge of the second row of facets and a bead heel surface, the second circumferential passageway being in fluid communication with the plurality of gaps of the second row of facets.

These and other features, aspects, and advantages of the present invention will become better understood with reference to the following description and appended claims.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings.

DESCRIPTION OF THE PREFERRED EMBODIMENT

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus or process pathway. To avoid redundancy, detailed descriptions of much of the apparatus once described in relation to a figure is not repeated in the descriptions of subsequent figures, although such apparatus or process is labeled with the same reference numbers.

As used herein, the term "inner" means toward the inside of the tire and/or rim and the term "outer" means toward the exterior of the tire and/or rim.

The term "axial" is used to refer to a direction which is parallel to the axis or rotation of the tire.

The term "radial" is used to mean a direction toward or away from the axis or rotation of the tire.

The term "lower" refers to the relative orientation of an exterior region of the tire closest to the bead portion.

The term "upper" refers to the relative orientation of an exterior region of the tire which is radially spaced from the nearest bead portion of the tire.

Figure 1:
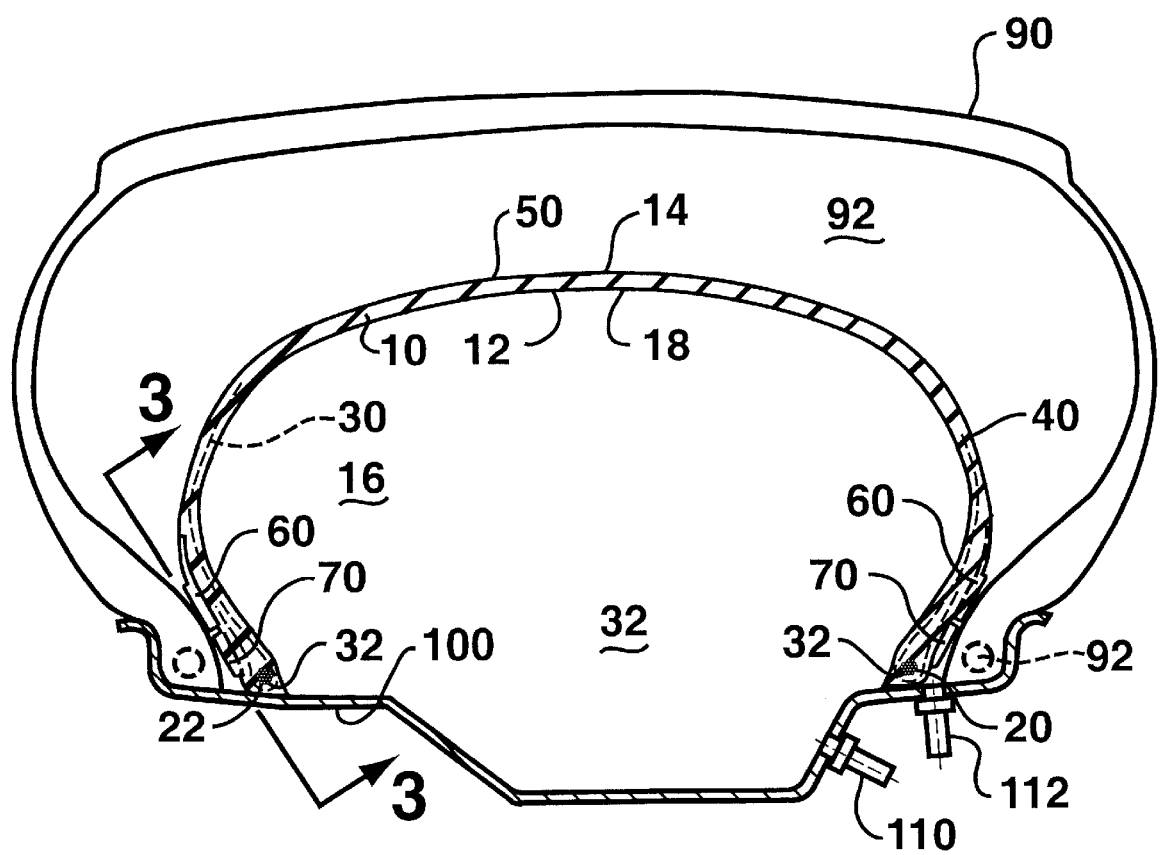
FIG. 1 is a cross-section view of the inner tire according to the present invention shown mounted on a rim and in relation to an outer tire.

Referring first to FIG. 1, there is illustrated a pneumatic structure in the form of a tire 10 which is adapted for use as an inner pneumatic liner positioned within the interior cavity of a tire. The tire 10 defines an inner surface 12 and an outer surface 14. Tire 10 defines an interior cavity 16 which, when secured to a wheel rim 100, provides an air chamber for inflation of the tire 10 using a conventional inflation valve 110. Tire 10 maintains its air pressure by an inner portion 18 seen here in the form of a butyl air containment barrier located along the interior surface 12 of the tire 10.

Tire 10 has a toroidal cross-section formed by a carcass 30. The carcass construction is one which is standard within the industry. As seen in reference to FIGS. 2A and 2B, carcass 30 has at least one reinforced ply extending from a first bead portion 20 to an axially displaced second bead portion 22. Each end 32 of the carcass 30 is anchored to a respective bead 20 or 22 and extends radially outward from the bead. A rubber cover portion 50, as seen in reference to FIG. 1, comprises a width-wise portion of the tire that is analogous to the tread portion of a conventional tire. A sidewall portion 40 extends radially inward from each lateral edge of the cover 50 to the respective bead 20 or 22.

Figure 3:
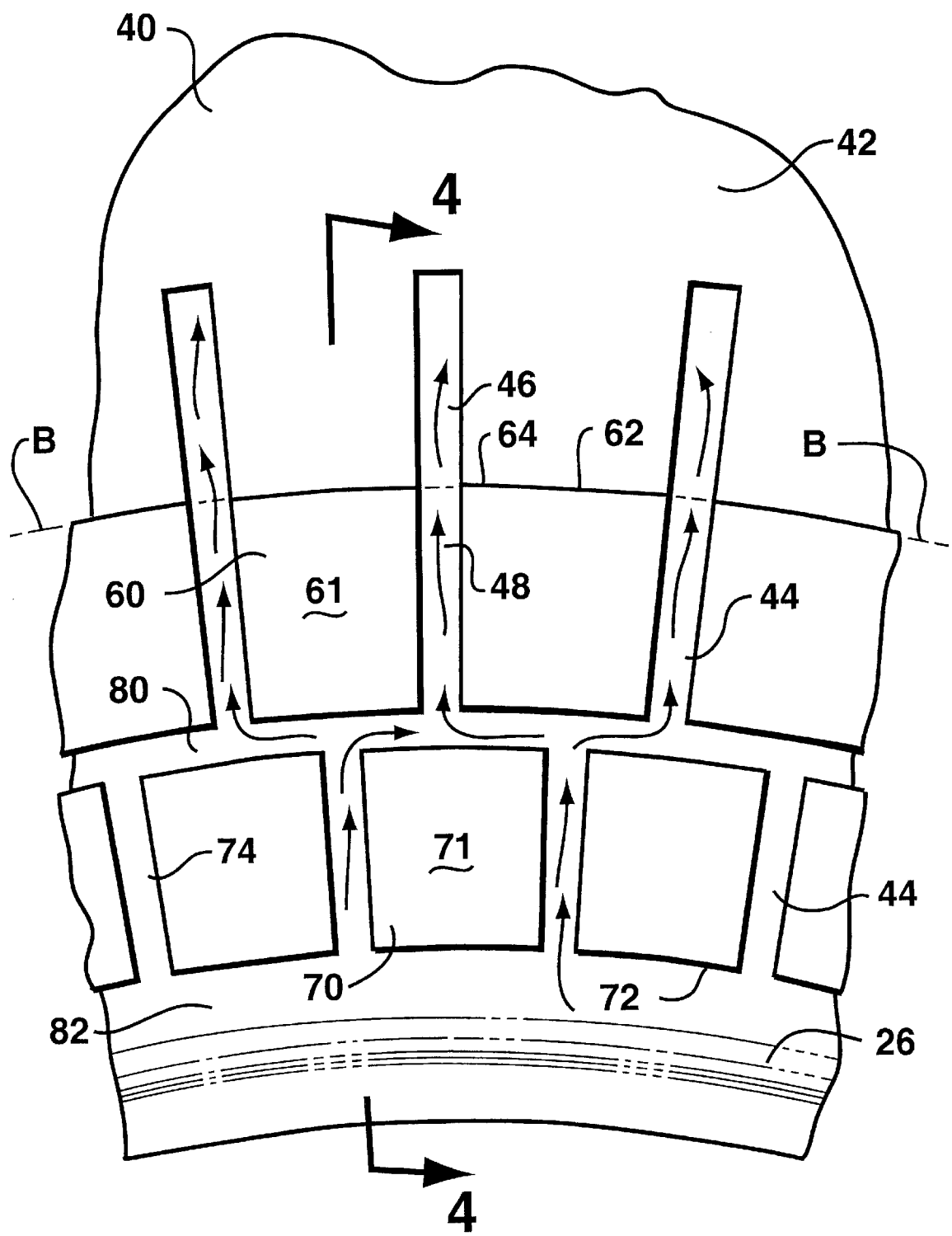
FIG. 3 is a side elevation view of the exterior surface of the inner tire as seen along line 3—3 of FIG. 1.
Figure 4:
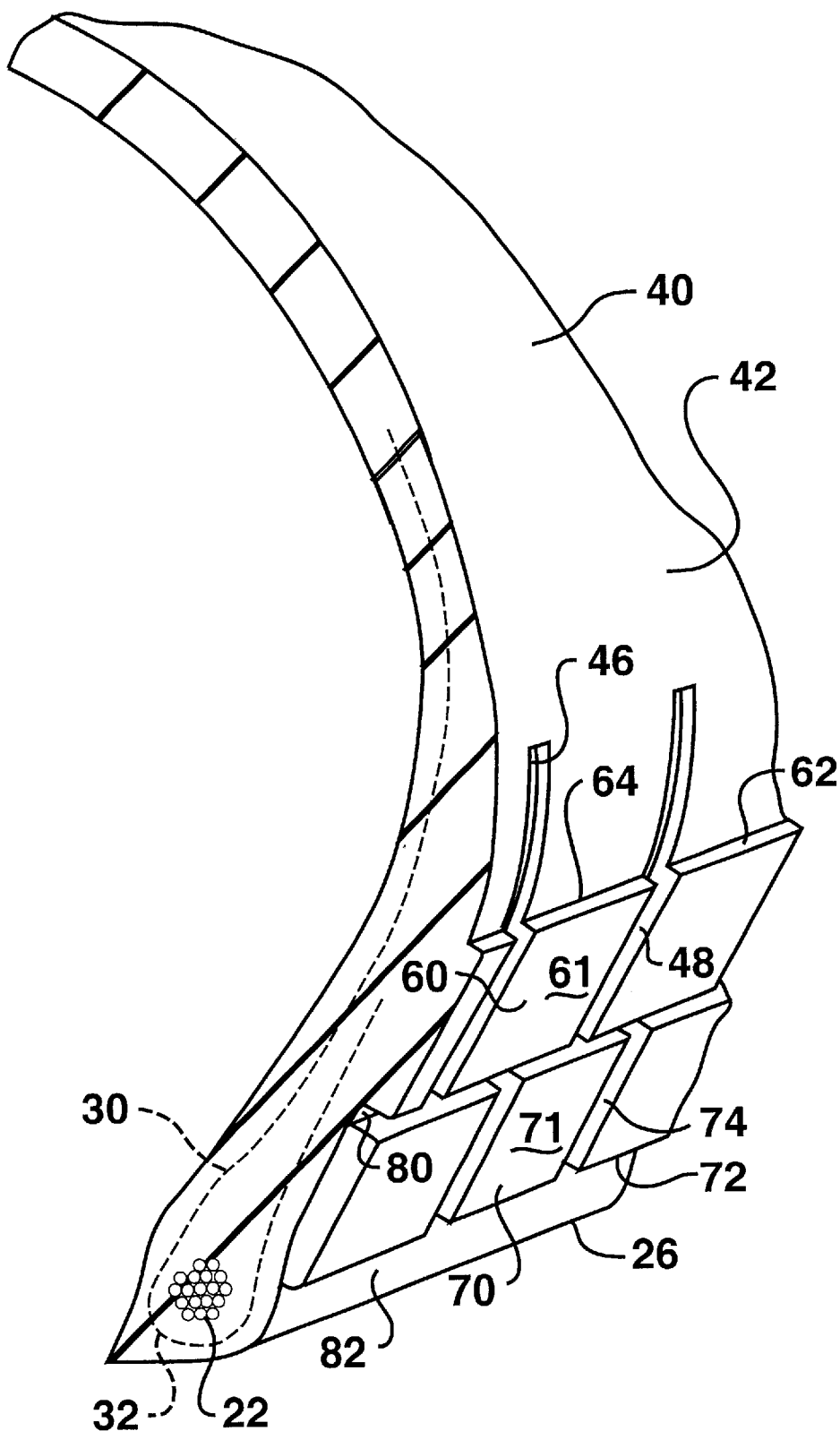
FIG. 4 is an edge view of the inner tire taken along line 4—4 of FIG. 3.

In reference to FIGS. 3 and 4, sidewall 40 defines an outer profile seen here in the form of an upper sidewall 42 and further defines an inner profile seen here in the form of a lower sidewall 44. The surface of lower sidewall 44 is recessed below a surface plane of the upper sidewall 42. As seen in reference to FIGS. 3 and 4, the boundary between the upper sidewall 42 and the lower sidewall 44 is formed along reference line "B". In one embodiment of the invention, the surface of the lower sidewall 44 is offset about 0.060 inches below a plane defined by the adjacent surface of the upper sidewall. The lower sidewall provides a support surface for two annular rows of facets comprised of individual facets 60 and 70 as will be described in further detail below. The dimensions of the lower sidewall are formed during curing from the dimensions of the curing ring. The upper sidewall dimensions are formed by the mold shell dimensions.

As seen in FIGS. 3 and 4, the upper sidewall 42 defines a plurality of grooves 46 which extend from the edge of the upper sidewall 42 in a radial direction toward the cover portion 50. Each groove 46 has a depth, relative to the upper side wall surface of about 0.060 inches and is in communication with a corresponding gap 48, each gap 48 being defined between two adjacent raised facets 60. A plurality of raised facets 60 form a first annular row of facets. Each facet 60 has a uniform height of about 0.125 inches above the lower sidewall surface 42 and provides a flat top surface 61. Further, each facet edge wall forms a right angle with respect to the subtending surface of the lower sidewall.

As best seen in reference to FIGS. 3 and 4, an outermost endwall 62 of each facet 60 terminates adjacent the lower edge of upper sidewall 42. In a preferred embodiment, the height of facet 60 and facet end wall 62 is about 0.065 inches above the adjacent surface of upper sidewall 42. Accordingly, a single right angle notch or step 64 is formed between the outermost edge of each facet end wall 62 and the adjacent upper sidewall 42. As seen by this arrangement, groove 46 and gaps 48 form a continuous channel in a radial direction along the respective upper sidewall 42 and lower sidewall 44.

A second annular row of raised surface projections is provided by a plurality of individual facets 70. Each facet 70 extends from a lower edge opposite a respective bead portion 20 or 22 and extends in a radial direction along the lower sidewall 44. As seen in FIG. 3, each facet 70 is staggered with respect to the first row of facets 60 so that each facet 70 is opposite a gap 48 defined by the first row of facets.

Each facet 70 defines a raised projection having a flat top surface 71, as seen in FIG. 4, which extends above the exterior surface of the respective sidewall and bead portion of tire 10. Adjacent the underlying bead, an proximal facet wall 72 is provided which forms a right angle with respect to the bead heel surface 26. Each facet 70, as it extends radially from the proximal wall 72, rapidly increases to a desired thickness with respect to the adjacent exterior wall surface. Thereafter, each facet 70 extends radially outwardly at a uniform height of about 0.125 inches with respect to the lower sidewall surface. Between each facet 70, a radially extending gap 74 is defined between the raised edgewalls of the adjacent facets 70.

As seen in FIG. 3, the distal portion of gap 74 and the proximal portion of gap 48 are in fluid communication along an annular passageway 80 defined between the second row of facets 70 and the first row of facets 60. This arrangement facilitates the inflation of the exterior tire 90 by providing an air passageway which may enter through any gap 74 defined by the second row of facets 70, the air passageway extending into the annular passage 80 and thereafter through one or more radial gaps 48. With respect to any individual gap 48, air flow may continue through the grooves 46. Additionally, it is believed that as the air flow passes through gaps 48, the air flow is no longer restricted to movement exclusively through groove 46 and may be released into the air chamber 92 defined between the exterior of inner tire 10 and the interior of outer tire 90.

Figure 2A:
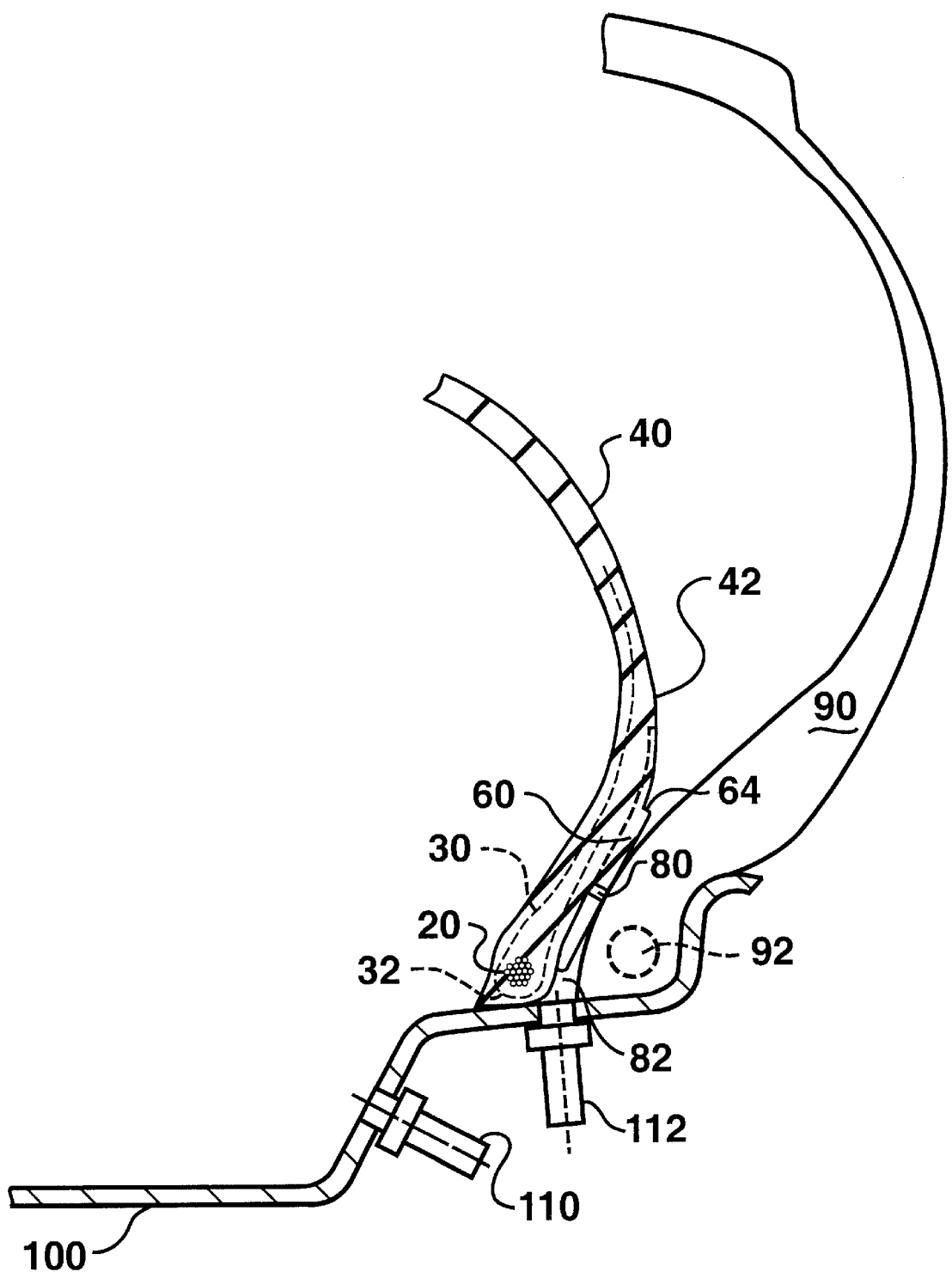
FIG. 2A is an enlarged view in partial section of the bead and sidewall portion of the inner tire and outer tire mounted on a tire rim.
Figure 2B:
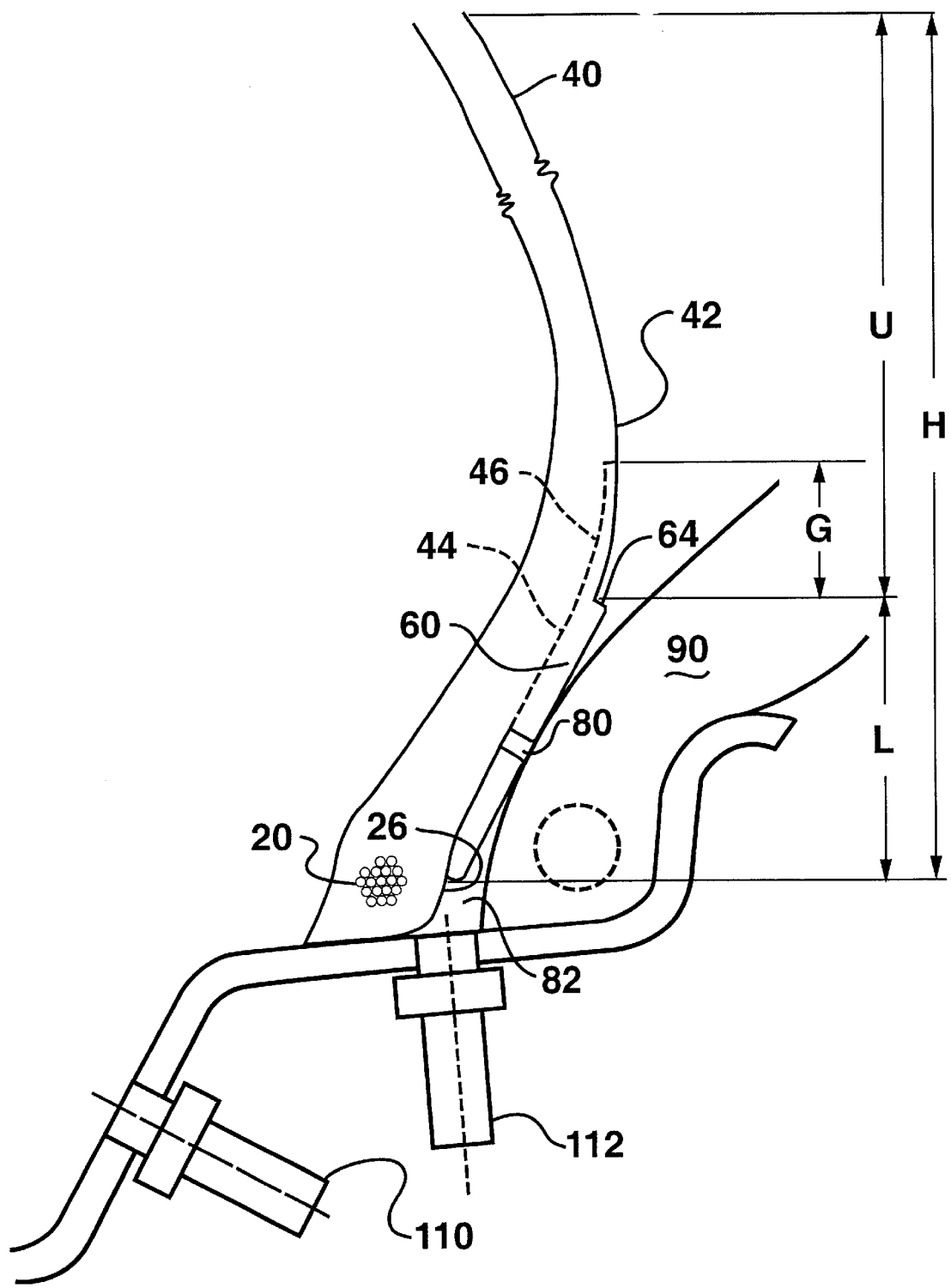
FIG. 2B is an enlarged view similar to FIG. 2A setting forth additional details of the bead and sidewall portions of the inner tire and outer tire.

As best seen in reference to FIG. 2B, one embodiment of the sidewall 40 of the inner tire 10 extends radially outwardly from the bead heel 26 a linear height "H" of 4.22 inches. The lower sidewall 44 extends a height "L" of 1.65 inches from the bead heel 26, the upper sidewall 42 extending the remaining height "U" of 2.57 inches for a collective sidewall height of 4.22 inches.

As best seen in reference to FIG. 2B, the floor of groove 46 can be coplanar with the surface of the lower sidewall 44.

In accordance with this invention, it is preferred that the radial length of end groove 46 extends to a point along the height of the sidewall that is about at least 50% of the total sidewall height. More preferably, groove 46 extends to a point about 60% of the total sidewall height so as to maintain an open air passageway between the inner and outer tires.

With respect to the exemplary embodiment referenced in the figures, groove 46 has a radial length "G" of 0.75 inches and extends radially outwardly from the upper boundary of the lower sidewall to a point 2.40 inches along the sidewall. Accordingly, the outermost radial terminus of groove 46 extends 57% of the total sidewall height of 4.22 inches.

It should be noted that the above dimensions of the inner liner components are with respect to an uninflated, molded product. As such, the stated dimensions reflect the actual mold dimensions used to mold the inner liner 10. It is readily appreciated by one having ordinary skill in the art that upon inflation of the pneumatic liner 10, the relative dimensions will vary as the inflation pressure brings about changes to the inner tire sidewall dimensions.

As best seen in reference to FIGS. 2A and 3, a second annular passageway 82 is defined between the second row of facets 70 and the bead wall surface 26 of inner tire 10. As seen in reference to FIG. 2A, the annular passageway 82 is positioned opposite the inflation valve 112. As illustrated, passageway 82 is opposite the interior bead wall 92 of exterior tire 90.

In accordance with this invention, it has been found that when the tire 10 is placed in operative engagement within the interior of a tire 90, the facets 60 and 70 each provide for a flat engaging surface which is used to interengage the smooth inner surface of the adjacent tire 90. Upon inflation of tire 10, the internal pressure helps seat tire 10 to the rim. In addition, the internal pressure within tire 10 brings about the interengagement of facets 60 and 70 with the adjacent inner surface of tire 90. In this manner, the flat surfaces of facets 60 and 70 help to seat outer tire 90 to the supporting rim. The tight interengagement between the facet surfaces and the inner surface of tire 90 occludes the passage of air between the respective engaged surfaces. Accordingly, the defined air passageways maintained between the inner tire 10 and the outer tire 90 as indicated by directional arrows in FIG. 3 are used to provide an air passageway between the inflation valve 110 and the air chamber of tire 90. As illustrated, air flow from the inflation port 112 is directed between the inner tire 10 and the outer tire 90. Air flow passes through gap 74, extends into annular passageway 80, and thereafter enters gap 48 and groove 46. The respective air passageways are maintained at a sufficient depth relative to the outer flat surfaces of the respective facets such that the air passageways do not collapse when the inner tire and outer tire are in operative engagement.

Preferably, the pressure of the inner tire 10 is maintained at a higher value than the inflation pressure of the outer tire. In this manner, should there be a loss of pressure by the outer tire, the pressurized inner tire provides an internal support for the outer tire so that the vehicle may be controlled and brought to a safe stop.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged, both in whole or in part. Therefore, the spirit and scope of the appended claims should not be limited to the description of the preferred versions contained therein That which is claimed is:

1. A pneumatic inner liner for mounting inside an adjacent tire, said inner liner comprising:

a pneumatic structure having an interior surface, an exterior surface, and a sidewall portion extending radially inward from each axial edge of a cover portion to a respective bead portion, said sidewall having an exterior surface further defining a plurality of first facets defining a first annular row, each of said first facets extending above an outer surface of the liner a uniform height, each first facet further having a plurality of edge walls which each form a substantially right angle with respect to the sidewall surface;

a plurality of first gaps defined between each of said plurality of first facets;

a plurality of second facets defining a second annular row, each of said second plurality of facets positioned on an exterior of the sidewall between a bead of said liner and said first annular row of facets, each of said plurality of second facets extending above an outer surface of the liner and further defining a plurality of edge walls, each of said edge walls forming a substantially right angle with respect to the exterior surface of the liner;

a plurality of gaps defined between each of said plurality of second facets of said second annular rows;

a first circumferential passageway defined between said first annular row and said second annular row, said first circumferential passageway in fluid communication with said plurality of first gaps and said plurality of second gaps; and, wherein each said plurality of first facets and said plurality of second facets have a flat upper surface adapted for engaging an inner surface of the adjacent tire.

2. The pneumatic inner liner according to claim 1 wherein said sidewall further defines a plurality of radial grooves, each of said radial grooves aligned with one of said gaps defined by said first annular row of facets.

3. The pneumatic inner liner according to claim 1 wherein the plurality of first facets are positioned opposite the plurality of second gaps defined by the second annular row of facets.

4. The pneumatic inner liner according to claim 1 wherein an upper surface of said first annular row of facets is substantially co-planar with an upper surface of said second annular row of facets.

5. A pneumatic inner liner according to claim 1 wherein a second circumferential passageway is defined between a proximal edge of said second row of facets and a bead heel surface.

6. A pneumatic inner liner according to claim 5 wherein said second circumferential passageway is in fluid communication with said plurality of gaps of said plurality of second facets.

7. The pneumatic inner liner according to claim 1 wherein said sidewall further defines an upper sidewall region and a lower sidewall region, said lower sidewall region having an exterior surface recessed with respect to the adjacent upper sidewall region, said first plurality of facets positioned along a surface of said lower sidewall, an upper surface of said plurality of first facets extending above a surface of the upper sidewall.

8. A pneumatic inner liner for mounting inside an adjacent tire, said inner liner comprising:

a pneumatic structure having an interior surface, an exterior surface, and a sidewall portion extending radially inward from each axial edge of a cover portion to a respective bead portion, said sidewall having an exterior surface further defining a plurality of facets forming an annular row, each of said plurality of facets extending above an exterior surface of the liner a uniform height, each facet further having a plurality of edge walls which each form a substantially right angle with respect to the sidewall surface, each facet having a flat upper surface adapted for engaging an inner surface of the adjacent tire;

a plurality of gaps defined between each of said plurality of facets;

a circumferential air passageway defined between said annular row and said bead portion, said circumferential passageway in fluid communication with said plurality of gaps; and, a plurality of radial grooves defined by the sidewall, each of said radial grooves aligned with one of said gaps defined by said annular row of facets.

9. The pneumatic inner liner according to claim 8 wherein said sidewall further defines an upper sidewall region and a lower sidewall region, said lower sidewall region having an exterior surface recessed with respect to the adjacent upper sidewall region, said plurality of facets positioned along a surface of said lower sidewall, an upper surface of said plurality of facets extending above said upper sidewall surface.

10. The pneumatic inner liner according to claim 8 wherein each of said radial grooves defines an outermost radial terminus positioned a distance along the sidewall of at least about 50% of a height of the sidewall.

11. The pneumatic inner liner according to claim 9 wherein each of said radial grooves defines an outermost radial terminus positioned a distance along the sidewall of at least about 50% of a height of the sidewall.

* * * * *